United States Patent
Mackie

(10) Patent No.: US 11,720,889 B2
(45) Date of Patent: *Aug. 8, 2023

(54) SYSTEM FOR PERFORMING A VALIDITY CHECK OF A USER DEVICE

(71) Applicant: Visa Europe Limited, London (GB)

(72) Inventor: Nicolas David Mackie, London (GB)

(73) Assignee: Visa Europe Limited, London (GB)

( * ) Notice: Subject to any disclaimer, the term of this patent is extended or adjusted under 35 U.S.C. 154(b) by 110 days.

This patent is subject to a terminal disclaimer.

(21) Appl. No.: 17/357,453

(22) Filed: Jun. 24, 2021

(65) Prior Publication Data
US 2021/0319440 A1 Oct. 14, 2021

Related U.S. Application Data

(63) Continuation of application No. 16/090,939, filed as application No. PCT/EP2017/058460 on Apr. 7, 2017, now Pat. No. 11,080,692.

(30) Foreign Application Priority Data

Apr. 12, 2016 (EP) .................................. 16164948

(51) Int. Cl.
*G06Q 20/38* (2012.01)
*G06Q 50/30* (2012.01)
(Continued)

(52) U.S. Cl.
CPC ....... *G06Q 20/3827* (2013.01); *G06Q 20/045* (2013.01); *G06Q 20/3278* (2013.01);
(Continued)

(58) Field of Classification Search
None
See application file for complete search history.

(56) References Cited

U.S. PATENT DOCUMENTS 10,210,521 B2 2/2019 Wagner et al.
2006/0144943 A1* 7/2006 Kim .................. G06K 7/10079
235/451

(Continued)

FOREIGN PATENT DOCUMENTS

EP 2605204 6/2013
EP 2991041 3/2016
(Continued)

OTHER PUBLICATIONS

V. Cortier, A. Filipiak, J. Florent, S. Gharout and J. Traoré, "Designing and Proving an EMV-Compliant Payment Protocol for Mobile Devices," 2017 IEEE European Symposium on Security and Privacy (EuroS&P), Paris, France, 2017, pp. 467-480, doi: 10.1109/EuroSP.2017.19. (Year: 2017).*

(Continued)

*Primary Examiner* — Jacob C. Coppola
(74) *Attorney, Agent, or Firm* — Kilpatrick Townsend & Stockton LLP

(57) ABSTRACT

There is disclosed a system for performing a validity check of a user device having an application stored thereon. The apparatus comprises a coupling device operable to communicate with the user device via near field communication, a processor, and memory storing program code for execution by the processor and validity check data. The program code comprises executable instructions to receive a determinate user device identifier from the user device via the coupling device and to receive application data from the user device via the coupling device, the application data being characteristic of the application stored on the user device. The program code processes the user device identifier and the application data to generate a test token, and determines whether the test token is a valid token using the validity check data.

19 Claims, 2 Drawing Sheets

(51) Int. Cl.
- *G06Q 20/36* (2012.01)
- *G06Q 20/04* (2012.01)
- *G06Q 20/40* (2012.01)
- *G06Q 20/32* (2012.01)
- *G06Q 20/34* (2012.01)

(52) U.S. Cl.
CPC ......... *G06Q 20/352* (2013.01); *G06Q 20/363* (2013.01); *G06Q 20/3674* (2013.01); *G06Q 20/409* (2013.01); *G06Q 50/30* (2013.01); *G06Q 20/346* (2013.01)

(56) References Cited

U.S. PATENT DOCUMENTS

| | | |
|---|---|---|
| 2007/0012763 A1 | 1/2007 | Van De Velde et al. |
| 2008/0201212 A1 | 8/2008 | Hammad et al. |
| 2010/0153267 A1 | 6/2010 | Ghaidan et al. |
| 2010/0252624 A1 | 10/2010 | Van de Velde et al. |
| 2011/0166914 A1 | 7/2011 | Dixon et al. |
| 2011/0225094 A1 | 9/2011 | Hammad |
| 2011/0231940 A1 | 9/2011 | Perumal et al. |
| 2011/0246369 A1 | 10/2011 | De Oliveira et al. |
| 2014/0040149 A1 | 2/2014 | Fiske |
| 2014/0074637 A1 | 3/2014 | Hammad |
| 2015/0012434 A1 | 1/2015 | Aabye et al. |
| 2015/0220917 A1 | 8/2015 | Aabye et al. |
| 2017/0228949 A1 | 8/2017 | Trani |

FOREIGN PATENT DOCUMENTS

| | | |
|---|---|---|
| WO | 2015001376 | 1/2015 |
| WO | 2018022104 | 2/2018 |

OTHER PUBLICATIONS

U.S. Appl. No. 16/090,939 , Final Office Action, dated Sep. 21, 2020, 10 pages.
U.S. Appl. No. 16/090,939 , Non-Final Office Action, dated May 6, 2020, 13 pages.
EP16164948.8 , "Brief Communication Regarding Oral Proceedings", May 28, 2019, 9 pages.
Application No. EP16164948.8 , Office Action, dated Jun. 18, 2018, 2 pages.
Killer et al., "An Off-The-Shelf Relay Attack in a Contactless Payment Solution", Available Online at: https://files.ifi.uzh.ch/CSG/staff/tsiaras/Extern/Theses/VA.ChrsitianKiller.pdf, Jan. 1, 2015, 6 pages.
Application No. PCT/EP2017/058460 , International Search Report and Written Opinion, dated May 31, 2017, 13 pages.
Saparkhojayeve et al., "Access Control and Management System Based on NFC-Technology by the Use of Smart Phones as Keys", Middle East Journal of Scientific Research, vol. 21, No. 7, Jan. 1, 2014, p. 1130-1135.
Zuquete , "ISO/IEC 14443-3 Initialization and Anticollision for Type A and Type B Tags", Available Online at: http://sweet.ua.pt/andre.zuquete/Aulas/IRFID/11-12/docs/IRFID_avz_2.pdf, Aug. 11, 2011, 8 pages.

* cited by examiner

SYSTEM FOR PERFORMING A VALIDITY CHECK OF A USER DEVICE

This application is continuation of U.S. application Ser. No. 16/090,939 filed Apr. 7, 2017, which is a National Stage of International Application No. PCT/EP2017/058460 filed Apr. 7, 2017, and which claims the benefit of European Patent Application No. 16164948.8 filed Apr. 12, 2016, of which are all herein incorporated by reference.

TECHNICAL FIELD

The present invention relates to a validity check performed by a system which communicates using near field communication with a user device having an application stored thereon. The invention has particular, but not exclusive, relevance to a validity check of a payment application on a user device during use of the payment application to gain access to a mass transportation system.

BACKGROUND

It is known to use contactless smart cards to gain access to a mass transportation system. For example, Transport for London have enabled payment on the London public transport system using both a proprietary contactless smart card solution, in part administered by Transport for London, and contactless payment card solutions using EMV payment cards or other contactless payment devices conforming to the EMV specifications. Proximity coupling devices provided at access points to the London public transport system communicate with the contactless cards using near field communication to authorise access to the London public transport system and to arrange payment of the required fare. The use of either the proprietary contactless smart card solution or the contactless payment device solution has the advantage of removing the need of a paper ticket being issued by a ticketing machine.

The Transport for London proprietary smart card solution requires that the proprietary smart card be pre-loaded with funds to cover payment of travel fares. Accordingly, it can be more convenient to use the contactless payment device solution using an EMV payment device, such as a credit card or a debit card.

When using an EMV contactless payment device, a number of validity checks are performed before a transaction is authorised. For the London public transport system, offline data authentication (ODA) is performed using a Dynamic Data Authentication technique such as those defined in the EMV specifications, for example fast Dynamic Data Authentication (fDDA) or Combined Data Authentication (CDA), to authenticate the contactless payment device.

Other mass transportation systems plan to implement similar schemes to that employed by the London public transport system in which EMV contactless payment devices can be used for gaining access to the mass transportation system. However, in many countries the capability for EMV contactless payment devices such as EMV payment cards to comply with Dynamic Data Authentication mechanisms is not universal. Accordingly, a need exists for alternative validity checks to impede attempts to gain access to the mass transportation system fraudulently.

SUMMARY

According to a first aspect of the present invention, there is provided a system for performing a validity check of a user device having an application stored thereon, the apparatus comprising a coupling device operable to communicate with the user device via near field communication, a processor, and memory storing program code for execution by the processor and validity check data. The program code comprises executable instructions to receive a determinate user device identifier from the user device via the coupling device, receive application data from the user device via the coupling device, the application data being characteristic of the application stored on the user device, process the user device identifier and the application data to generate a test token, and determine whether the test token is valid using the validity check data. By linking the application data and the user device identifier in a token, checking the validity of the token provides a check that a particular combination of user device identifier and application data is valid. In this way, attacks based on supplying multiple sets of application data in the aim of identifying a valid set of application is made ineffective as unless used with the correct user device identifier then the test token will not be a valid token.

The validity check data may comprise a list of valid tokens, wherein the program code comprises executable instructions to determine whether the test token is in the list of valid tokens.

The program code may comprise a first set of instructions for determining the presence of a coupling device within coupling range of the coupling device and a second set of instructions for interacting with an application stored by the user device, wherein the user device identifier is received during execution of the first set of instructions and the application data is received during execution of the second set of instructions. The first set of instructions may comprise an anti-collision process in case of the presence of multiple user devices within coupling range of the coupling device.

In an example, the system further comprises a network interface and the program code comprises instructions for receiving the validity check data via the network interface from an issuing bank or an associated party authorised by the issuing bank.

The program code may comprise executable instructions to, in response to determining that the test token is not a valid token, generate a validation request message comprising payment data, transmit the validation request message to a remote validation system via the network interface, receive a validation reply message via the network interface, and if the validation reply message indicates that the payment data is valid, modify the validity check data accordingly.

In an example, the program code comprises instructions for processing payment data from a payment application stored by the user device, and wherein the application data comprises a primary account number received from the user device. The application data may further comprise an expiry date associated with the primary account number.

In an example, the coupling device is mounted to an entry barrier for a mass transportation system, and payment data is generated for travel on the mass transportation system.

According to a second aspect of the invention, there is provided a method of performing a validity check of a user device having an application stored thereon, the method comprising: receiving, via near field communication, a determinate user device identifier from the user device; receiving, via near field communication, application data from the user device, the application data being characteristic of the application stored on the user device; processing the user device identifier and the application data to generate a test token; and determining whether the test token is valid using stored validity check data.

According to a third aspect of the invention, there is provided program code which, when executed by a processor, performs a validity check of a user device having an application stored thereon by processing a received determinate user device identifier and received application data to generate a test token, and then comparing the test token with validity check data to check if the test token is a valid token.

Further features and advantages of the invention will become apparent from the following description of preferred embodiments of the invention, given by way of example only, which is made with reference to the accompanying drawings.

DETAILED DESCRIPTION

Figure 1:
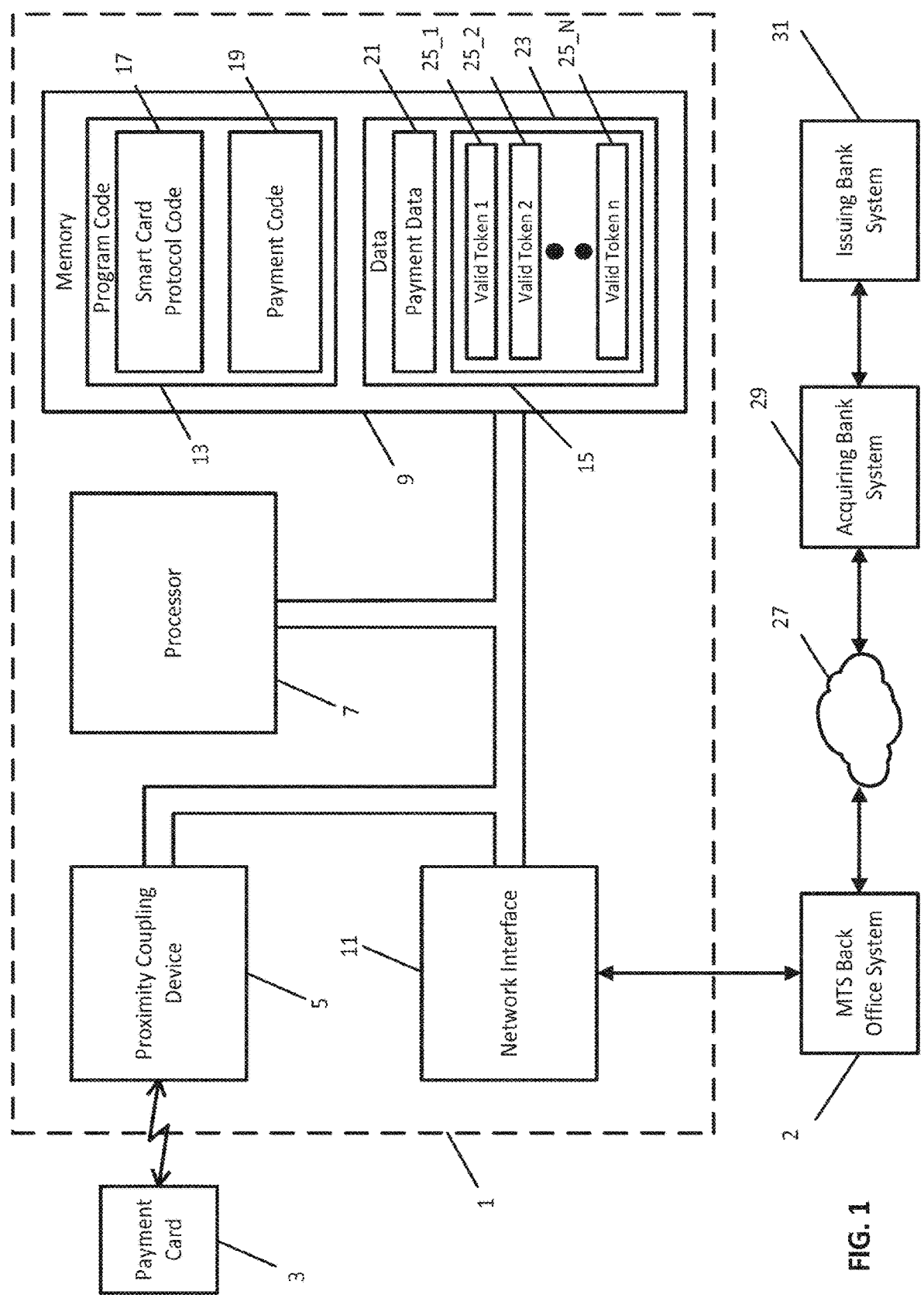
FIG. 1 shows a schematic block diagram illustrating the main components of an access system for a mass transportation system together with a payment card, and an acquiring bank system and an issuing bank system connected to the access system.

In an example, an access system for a mass transportation system has a plurality of access point devices 1, only one of which is illustrated in FIG. 1 for ease of illustration, connected to a mass transportation system back office system 2. A shown in FIG. 1, in an example an access point device 1 communicates with a payment card 3. In this example, the payment card 3 is an ISO/IEC 14443 Type A contactless smart card having a payment application conforming to the EMV protocol stored thereon. The access point device 1 includes a proximity coupling device 5 that can communicate with the payment card 3 using near field communication.

In this example, the access point device 1 is positioned at an entrance point to the mass transportation system. Although only one access point device 5 is shown in FIG. 1, it will be appreciated that many access point devices 5 may be deployed distributed around all the entrance points to the mass transportation system. In some examples, the access point devices 5 are mounted in association with entrance/exit gates (not shown) which are controlled by the access system 1 in dependence on the interaction between the access point device 1 and the payment card 3. The use of entrance/exit gates is not, however, required in an implementation of the invention.

The proximity coupling device 5 is interconnected within the access point device 1 with a processor 7, memory 9 and network interface 11 by a bus system.

The memory 9 stores program code 13 and data 15. Although memory 9 is shown as a single component in FIG. 1 with the program code 13 and data 15 being shown separately for ease of illustration, it will be appreciated that in practice the memory 9 may involve several memory devices having different properties (e.g. volatility and latency) and standard memory management techniques may be used to store the program code 13 and data 15 within the memory 9.

The program code 9 includes smart card protocol code 17 which, when executed by the processor 7, implements communication with the payment card 3 in accordance with the ISO/IEC 14443 protocol. The program code 9 also includes payment code 19 which, when executed by the processor 7, implements communication with the EMV payment application stored on the payment card 3 to generate payment data for use of the mass transportation system.

The data 15 includes a cache of recent payment data 21 generated by the payment code 19 and a list 23 of valid tokens 25_1, 25_2, ... 25_N. As will be described in more detail hereafter, in accordance with the invention the payment code 19 calculates a test token for a payment card 3 and determines if the test token matches a valid token in the list 23 of valid tokens as a validity check. If the test token is in the list 23 of valid tokens, then the payment card 3 passes the validity check.

The network interface 11 permits communication, via a communication network with the back office system 2. The back office system 2 collects payment data generated by all the access point devices 1, and periodically (e.g. every day) processes the collected payment data associated with the payment card 3 and generates payment requests that are sent, via one or more communication networks (e.g. the Internet 27), to the data processing system 29 of an acquiring bank associated with the mass transportation system, which in turn sends the payment request to the data processing system 31 of an issuing bank (or an entity authorised by the issuing bank) for the payment card 3. In this way, the access system 1 can send data to the issuing bank system 31 requesting payment associated with travel on the mass transportation system.

As discussed above, the smart card protocol code 17 complies with the ISO/IEC 14443 protocol, which makes various requirements on the way that a smart card communicates with a proximity coupling device. These requirements underlie those of any application on the payment card 3, and accordingly the smart card protocol 17 forms a lower layer protocol below an application layer protocol, such as the EMV payment application, on the payment card 3.

The ISO/IEC 14443 protocol includes an anti-collision protocol which performs an anti-collision process to identify, and prevent collisions between, smart cards within coupling range of the coupling device. For the purpose of the anti-collision process, a smart card transmits a smart card identifier by which the smart card can be identified by the proximity coupling device. The ISO/IEC 14443 specifies two possible configurations, Type A and Type B. For ISO/IEC 14443 Type A, the smart card identifier is called a unique identifier (UID), which in practice need not be strictly unique to a particular smart card. The UID can be either static or dynamic. A smart card with a static UID uses the same UID for every interaction with a proximity coupling device, whereas a smart card with a dynamic UID may vary the value of the UID used for different interactions with proximity coupling devices.

In the example of FIG. 1, the payment card 3 is an ISO/IEC 14443 Type A smart card having a static UID. As specified by the ISO/IEC 14443 protocol, this static UID has either four bytes, seven bytes or ten bytes of data. The access system 1 implements the smart card protocol code 17 to detect the presence of the payment card 3 within the coupling range of the proximity coupling device 5. Following detection of the payment card 3, the smart card protocol code 17 implements the anti-collision process of ISO/IEC 14443 during which the proximity coupling device 5 receives the UID of the payment card 3.

Following the identification of the payment card 3 using the ISO/IEC 14443 protocol, the access system 1 implements the payment code 19 which results in application layer messages being transmitted between the access system 1 and a payment application provided on the payment card 3. The payment application stored by the payment card 3 has an associated Primary Account Number (PAN) that uniquely identifies a payment account of the issuing bank. The payment application stored by the payment card 3 also has an associated expiry data.

The payment code 19 performs a number of validity checks before in association with the generation of payment data for accessing the mass transportation system. One reason for performing these validity checks is to frustrate fraudulent attempts to gain access to the mass transportation system using devices that attempt to mimic the behaviour of the payment card 3. Where fDDA is not successfully executed between the payment card 3 and the access point device 1, an alternative validity check may be required. In this example, the validity checks performed by the payment code comprise a novel validity check that confirms that the combination of the UID, PAN and expiry data is valid, as described hereafter.

For the purpose of this novel validity check, the issuing bank (or an associated third-party on its behalf) calculates a token value for each payment card 3 issued that can be used to gain access to the mass transportation system. In this example, the UID of a payment card 3, the PAN of the payment application and the expiry data of the payment application are concatenated and then tokenised, for example using a one-way hash function, to generate the token for the payment card 3. In this way, the issuing bank generates a list of valid tokens corresponding to all the payment cards 3 that can be used to gain access to the mass transportation system.

The issuing bank then supplies the list of valid tokens to the access system 1 of the mass transportation system, for example via the Internet 27 and the network interface 11 using a secure communication protocol. In this way, the list 23 of valid tokens 25 within the memory 9 is populated. It will be appreciated that by using tokenisation, sensitive financial data such as the PAN of a payment application is not derivable from the data stored by the access system 1.

Subsequently, following receipt of the UID of the payment card 3, and the PAN and expiry data associated with the payment application stored on the payment card 3 as describes above, the payment code 19 concatenates the UID, the PAN and expiry data and tokenises the resultant concatenation to generate a test token, the concatenation and tokenisation processes performed by the payment code 19 mirroring those performed by the issuing bank. The payment code 19 then determines whether the test token for the payment card 3 matches any of the list 23 of valid tokens 25. It the test token does match a valid token 25, and any other required validity checks are satisfied, then the payment application generates payment data that is temporarily stored in the payment data section 21 of the memory 9 before being sent to the back office system 2. This payment data includes the PAN for the payment application and also includes details of the identity of the access point device 1 and the time at which the payment data is generated.

The present system can apply to mass transportation systems which employ any fare structure. In some examples, the interaction between the payment card 3 and the payment application can be performed on entry to the mass transportation system, while in other examples the interaction is performed—on both entry to and exit from the mass transportation system. The use of gates or turnstiles in association with access point devices is optional.

The novel validity check described above has a number of advantages. The novel validity check provides some protection against 'number tumbler' type attacks when various combinations of payment application data are communicated fraudulently to the payment application 19 in the aim of eventually providing a valid set of application data. This is a particular advantage when payment cards 3 do not support offline data authentication (ODA) using dynamic methods such as those described, in the EMV specifications. For example, the novel validity check does not require online communication with the issuing bank system 27 during the interaction between the payment card 3 and the payment application 19. Such online communication may take from two to eight seconds (perhaps longer at peak times), which is undesirable when a large number of people need to use the proximity coupling device 5 in a short amount of time.

Although the novel validity check frustrates some fraudulent attacks, the use of ODA is preferred to gain access to a mass transportation system. It is often not feasible to issue contactless payment cards that all have ODA functionality, but in an example the access system 1 keeps track of payment cards 3 that have been used, to gain access and do not have ODA functionality, and passes that list to the issuing bank on the basis that the issuing bank can prioritise issuing contactless payment cards with ODA functionality to the financial account holders associated with those payment cards.

In the above examples, the list 23 of valid tokens 25 is pre-populated with valid tokens by the issuing bank. In an alternative example, if a test token is not present in the list of valid tokens, then the payment code 19 generates a validation request message containing payment data that is sent to the issuing bank system 27 as part of an online data authentication process. If the payment data is validated by the issuing bank system 27, then the issuing bank system 27 sends a validation reply message indicating that the payment data is valid, then the payment code 19 adds the test token for the payment card 3 to the list 23 of valid tokens 25 (via the back office system which distributes the valid test token across all access point devices). In this way, the list 23 of valid tokens 25 is populated over time as different payment cards are used to gain access to the mass transportation system. Although the online interaction with the issuing bank system 27 may take from two to eight seconds (or longer), this delay only occurs the first time that a payment card is used.

The examples discussed above envisage the use of a static UID, rather than a dynamic UID. In this way, the generated test token can simply be compared with a list of valid test tokens. Alternatively, the UID can be dynamic in a determinative manner, for example being deter mined by processing a seed value in a manner that varies over time in a known way. In such an arrangement, the test token would also vary over time, but a validity check could still be performed as the test token varies over time in a known way.

Figure 2:
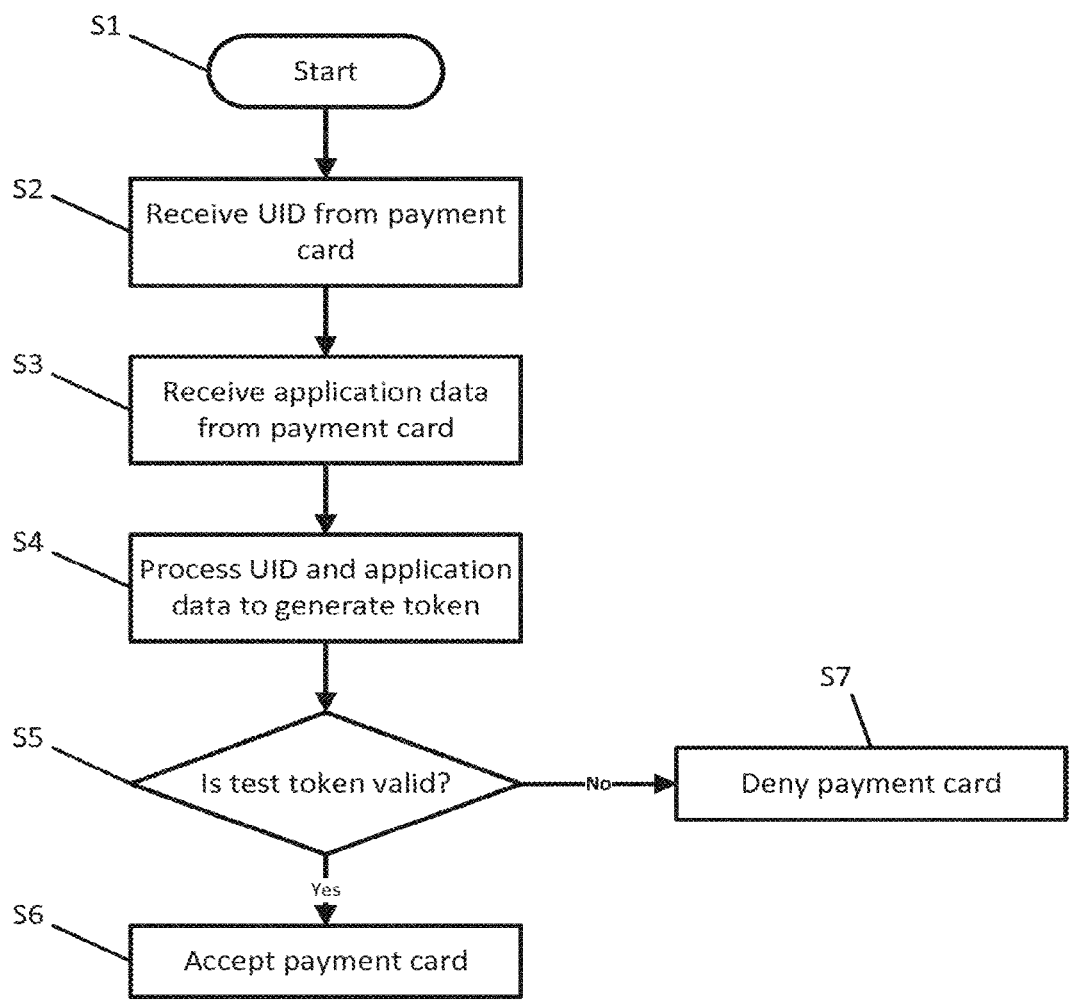
FIG. 2 shows a flow chart showing the main operations performed by the access system of FIG. 1.

FIG. 2 illustrates a flow chart outlining a method of implementation of the invention within an access system. As shown, following the start, at S1, of the method, which may correspond to the detection of the presence of a payment card, the access system receives, at S2, the UID from the payment card. The access system then receives, at S3, the application data from the payment card and processes, at S4, the received UID and application data to generate a test token. The access system then checks, at S5 if the test token is valid using stored validity check data. If the test token is valid, then the access system accepts the card, at S6. On the contrary, if the test token is not valid then the access system denies, at S7, the payment card.

In the above examples, a contactless payment card 3 conforming to the ISO/WC 14443 is used to access a mass transportation system. It will be appreciated that it is known that contactless payment cards can be validly emulated by other user devices capable of near field communication, for example mobile phones, and the present invention is equally applicable to the use of such user devices.

Although the invention has been described above in the context of a mass transportation system, the invention can be utilised for other application. For example, the invention can be used in other purchasing systems, or for systems for permitting access to a building, such as a cinema, or an attraction, such as a theme park. It could also be used in parking and toll environments.

The present invention also has application outside of EMV payment devices that communication with proximity coupling devices as defined in the ISO/IEC 14443 standard, and is generally applicable in which user devices have determinate user device identifiers and applications stored thereon which communicate via near field communication with a coupling device. Preferably, the user device identifier is associated with a lower protocol layer than the stored application so that the test token cannot be determined from data from the stored application alone.

The above embodiments are to be understood as illustrative examples of the invention. Further embodiments of the invention are envisaged. Equivalents and modifications not described above may also be employed without departing from the scope of the invention, which is defined in the accompanying claims.

The invention claimed is:

1. A system for performing a validity check of a user device having an application stored thereon, the system comprising:
 a coupling device operable to communicate with the user device via near field communication;
 a processor; and
 memory storing program code for execution by the processor,
 wherein the program code comprises executable instructions to:
 receive a user device identifier from the user device via the coupling device;
 after receiving the user device identifier, receive application data from the user device via the coupling device, the application data comprising at least an account number associated with the application stored on the user device;
 generate a test token by concatenating and then tokenizing at least the user device identifier and the account number;
 compare the generated test token to a list of valid tokens; and
 determine that the test token is a valid token when the test token matches a token from the list of valid tokens; and
 wherein the program code comprises:
 a set of instructions to determine the presence of the user device within coupling range of the coupling device and to perform an anti-collision process in case of the presence of multiple user devices within coupling range of the coupling device,
 wherein the user device identifier is received during the anti-collision process.

2. The system according to claim 1, wherein the set of instructions is a first set of instructions, and the program code further comprises:
 a second set of instructions for interacting with the application stored by the user device,
 wherein the user device identifier is received during execution of the first set of instructions and the application data is received during execution of the second set of instructions.

3. The system according to claim 1, further comprising a network interface, wherein the program code comprises instructions for receiving the list of valid tokens via the network interface.

4. The system according to claim 1, further comprising a network interface, wherein the program code comprises executable instructions to, in response to determining that the test token is not a valid token:
 generate a validation request message comprising payment data;
 transmit the validation request message to a remote validation system via the network interface;
 receive a validation reply message via the network interface; and
 if the validation reply message indicates that the payment data is valid, update the list of valid tokens to include the test token.

5. The system according to claim 1, wherein the program code comprises instructions for processing payment data from a payment application stored by the user device.

6. The system according to claim 1, wherein the program code further comprises instructions for generating payment data in association with the account number.

7. The system according to claim 6, wherein the coupling device is mounted to an entry barrier for a mass transportation system, wherein the payment data permits travel on the mass transportation system.

8. The system according to claim 1, wherein the system is part of a mass transportation system.

9. A method of performing a validity check of a user device having an application stored thereon, the method comprising:
 receiving, by a coupling device via near field communication, a user device identifier from the user device;
 receiving, by the coupling device, via near field communication, application data from the user device, the application data comprising at least an account number associated with the application stored on the user device;
 generating, by the coupling device, a test token by concatenating and then tokenizing at least the user device identifier and the account number;
 comparing, by the coupling device, the generated test token to a list of valid tokens; and
 determining, by the coupling device, that the test token is a valid token when the test token matches a token from the list of valid tokens, and
 wherein the method further comprises:
 determining the presence of the user device within coupling range of the coupling device and performing an anti-collision process in case of the presence of multiple user devices within coupling range of the coupling device,
 wherein the user device identifier is received during the anti-collision process.

10. The method according to claim 9, further comprising:
 processing payment data from a payment application stored by the user device.

11. The method according to claim 9, further comprising:
 generating ticket data in association with the account number following successful validation of the test token.

12. The method of claim 9, wherein the user device is a mobile phone.

13. The method of claim 9, wherein the user device is a card.

14. The method of claim 9, wherein the user device is an EMV payment device.

15. The method of claim 9, wherein tokenizing comprises hashing.

16. The method of claim 9, wherein the user device allows a user to access a mass transportation system.

17. The method of claim 9, wherein the coupling device is mounted to an entry barrier of a mass transportation system.

18. The method of claim 9, wherein the anti-collision process uses an ISO/IEC 14443 protocol.

19. A computer program embodied in a non-transitory computer readable medium comprising a set of instructions that, when executed by a processor, cause the processor to perform steps including:

receiving, via near field communication, a user device identifier from a user device;

after receiving the user device identifier, receiving, by a coupling device via near field communication, application data from the user device, the application data comprising at least an account number;

generating a test token by concatenating and then tokenizing at least the user device identifier and the account number;

comparing the generated test token to a list of valid tokens; and determining that the test token is a valid token when the test token matches a token from the list of valid tokens, wherein the steps further include:

determining the presence of the user device within coupling range of the coupling device and performing an anti-collision process in case of the presence of multiple user devices within coupling range of the coupling device, wherein the user device identifier is received during the anti-collision process.

\* \* \* \* \*